United States Patent [19]

Milunas et al.

[11] Patent Number: 5,477,452
[45] Date of Patent: Dec. 19, 1995

[54] UPSHIFT INDICATOR FOR MANUAL TRANSMISSION

[75] Inventors: Rimas S. Milunas, Rochester Hills; William J. Bolander, Clarkston, both of Mich.

[73] Assignee: Saturn Corporation, Troy, Mich.

[21] Appl. No.: 92,273

[22] Filed: Jul. 15, 1993

[51] Int. Cl.$^6$ ............... F16H 61/00; F16H 59/14; F16H 61/04

[52] U.S. Cl. ............... 364/424.1; 364/442; 364/424.01; 340/439; 340/441; 340/461; 340/870.13; 340/456; 477/120; 477/107; 73/117.3; 73/118.1; 74/DIG. 7; 434/71

[58] Field of Search ............... 364/424.1, 426.01, 364/426.03, 442; 180/197; 73/117.3; 123/417, 416, 481, 351, 333; 74/866, 336 R, 856, 861; 340/439, 441, 461, 870.13, 456, 438, 466, DIG. 7; 434/71, 62, 64, 65, 63, 66, 67, 68, 69; 477/61, 120, 118, 905, 107

[56] References Cited

U.S. PATENT DOCUMENTS

| | | | |
|---|---|---|---|
| 4,038,889 | 8/1977 | Lindow et al. | 74/866 |
| 4,267,545 | 5/1981 | Drone et al. | 340/439 |
| 4,439,158 | 3/1984 | Weber | 434/71 |
| 4,555,591 | 11/1985 | Hosaka et al. | 340/441 |
| 4,559,599 | 12/1985 | Habu et al. | 340/439 |
| 4,564,906 | 1/1986 | Stephan et al. | 364/424.1 |
| 4,631,515 | 12/1986 | Blee et al. | 340/441 |
| 4,683,455 | 7/1987 | Kido et al. | 340/439 |
| 4,701,852 | 10/1987 | Ulveland | 364/424.01 |
| 4,703,304 | 10/1987 | Muguruma et al. | 364/424.01 |
| 4,709,775 | 12/1987 | Watanabe et al. | 364/424.1 |
| 4,752,883 | 6/1988 | Asakura et al. | 340/441 |
| 4,853,673 | 8/1989 | Kido et al. | 364/424.1 |
| 4,868,756 | 9/1989 | Kawanabe et al. | 340/439 |
| 4,933,851 | 6/1990 | Ito et al. | 364/424.1 |
| 4,991,097 | 2/1991 | Fodale et al. | 364/424.1 |
| 5,017,916 | 5/1991 | Londt et al. | 340/439 |
| 5,101,350 | 3/1992 | Tokoro | 364/424.1 |
| 5,165,308 | 11/1992 | Asada et al. | 364/424.1 |
| 5,188,005 | 2/1993 | Sankpal et al. | 364/424.1 |
| 5,233,523 | 8/1993 | Follmer | 364/424.1 |
| 5,233,525 | 8/1993 | Overmann et al. | 364/424.1 |
| 5,253,623 | 10/1993 | Melnyk et al. | 123/339 |
| 5,265,693 | 11/1993 | Rees et al. | 180/197 |
| 5,272,631 | 12/1993 | Iwatsuki et al. | 364/424.1 |
| 5,272,939 | 12/1993 | Markyvech et al. | 74/866 |

*Primary Examiner*—Kevin J. Teska
*Assistant Examiner*—Jacques H. Louis-Jacques
*Attorney, Agent, or Firm*—Vincent A. Cichosz

[57] ABSTRACT

A motor vehicle has a manual transmission and means for indicating to the operator a point in operation for upshifting to the next higher gear from the present gear. A method of determining the shift point is provided based upon actual operating parameters of the motor vehicle effecting current wheel torque and predicted wheel torque in the next higher gear. Calibration to a single value representing the ratio of predicted wheel torque to current wheel torque allows simple balancing between fuel economy and performance.

7 Claims, 5 Drawing Sheets

UPSHIFT INDICATOR FOR MANUAL TRANSMISSION

This invention relates to a shift indicator for a manual transmission automobile designed to induce the operator to shift at predetermined points.

BACKGROUND OF THE INVENTION

Shift indicators are commonly used on manual transmission vehicles to assist non-expert drivers in determining when it is appropriate to shift the transmission to a higher gear in order to maximize driving fuel economy. A system calibrated such that absolute maximum fuel economy would be obtained if a shift occurs at the point indicated by a shift indicator may exhibit a noticeable sag in axle torque at the shift and therefore result in an unpleasant shift feel to the operator. In such situations, operators quickly learn to ignore the shift indicator thus rendering it ineffective for its intended purpose of maximizing fuel economy. Fuel economy figures required to be displayed on new vehicles for sale in the United States are arrived at through a customer usage weighting of the fuel economy obtained on vehicles tested using the upshift indicator light and fuel economy obtained without using the upshift indicator light. It is therefore desirable to balance the pleasability of the shift at the point indicated by the shift indicator with the fuel economy benefits at that shift point since this will tend to result in higher customer usage, higher actual fuel economy and higher fuel efficiency ratings for a particular vehicle.

Conventional shift indicator calibration typically involves setting manifold absolute pressure (MAP) thresholds at a variety of speeds. Such a method can be time consuming and result in non-optimal shift points. Additionally, as actual engine torque changes due to spark retardation for control of engine knock as may be practiced in the engine control, the calibrated shift points based on MAP thresholds may no longer be appropriate, thereby exacerbating the aforementioned axle torque sag thus leading to operator disregard of the shift indicator and reduced fuel economy.

SUMMARY OF THE INVENTION

An objective of the present invention is therefore directed toward an improved method of determining shift points and indicating the same to a vehicle operator in order to maximize real driving fuel economy by balancing fuel economy with maximum shift pleasability.

Another object of the invention is to adapt shift indication for actual engine torque conditions.

A further object is to simplify the calibration of shift indicator systems and allow for flexible indexing of the system according to desired fuel economy versus performance profiles.

The control of the present invention calculates a term referred to as Upshift Torque Ratio (UTR) which represents the ratio of predicted wheel torque in the next highest gear to present wheel torque in the current gear. The UTR is compared to a predetermined calibration threshold value to determine if upshift indication is appropriate. The calibration threshold determines the characteristics and balance of the shift in terms of fuel economy and performance. A threshold value close to unity provides a shift point which will achieve maximum fuel economy, while a threshold value higher than unity will provide for increased performance shifting.

DETAILED DESCRIPTION OF THE DRAWINGS

Figure 1:
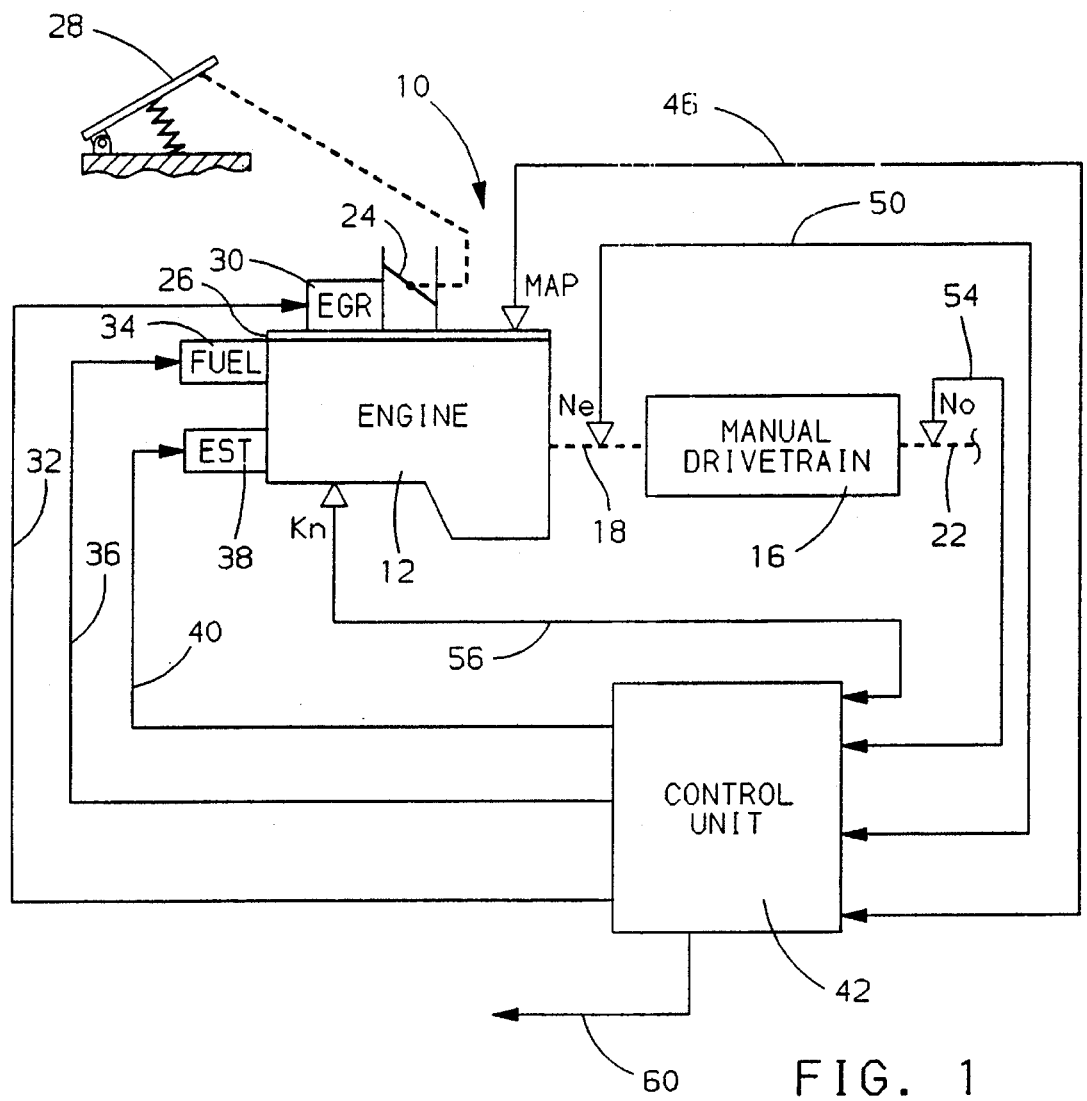
FIG. 1 shows a motor vehicle manual transmission drivetrain, spark ignition internal combustion engine and computer based engine control unit.

Referring to FIG. 1, the reference numeral 10 generally designates a motor vehicle drivetrain comprising a spark ignition internal combustion engine (engine) 12, engine output shaft 18 and the combination of conventional manual clutch, gearbox and final drive assembly (manual drivetrain) 16. Output shaft 22 drives the vehicle wheels (not shown) for propelling the vehicle at a speed directly proportional to its rotation.

A throttle 24 controls the ingestion of combustion air through the engine intake manifold designated by the numeral 26. Throttle 24 is positioned in a conventional manner by an operator-manipulated accelerator pedal 28, as indicated. An exhaust gas recirculation (EGR) actuator 30 additionally returns a controlled amount of exhaust gases to the manifold 26 in accordance with an EGR control signal on line 32. Engine fueling is controlled by a conventional fuel injection apparatus generally designated by the reference numeral 34 in accordance with a fuel pulse width signal on line 36.

The engine ignition function is carried out with a conventional spark ignition system (not shown) which cooperates with a conventional electronic spark timing (EST) unit 38 to initiate combustion in the various engine cylinders in accordance with a spark timing signal on line 40. Spark timing signals are generated by computer based engine control unit 42 in a predetermined manner in accordance with various operating parameters (including sensed engine knock) of the drivetrain 10 in a manner well known to those skilled in the art. Control unit 42 receives inputs required by the present embodiment including manifold absolute pressure (MAP) on line 46, engine speed (Ne) on line 50 and output speed (No) on line 54. Knock sensing means Kn are also shown providing signal input via line 56 to control unit 42. Control unit 42 indicates via line 60 the state of an upshift indicator light or equivalent visual display such as is found in conventional instrumentation in a motor vehicle. Line 60 may provide a logic signal to a instrument cluster for further processing or may drive a lamp directly via a power driver in control unit 42. Control unit 42 may be mechanized with a conventional state of the art microcomputer controller including a central processing unit, memory and input-output devices.

Figure 2:
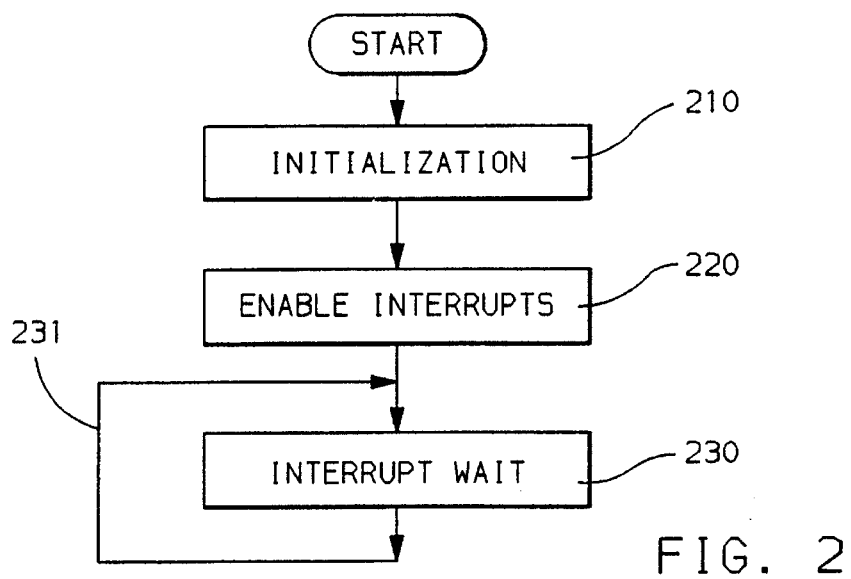
FIGS. 2–4, 5A and 5B are flow diagrams representative of computer program instructions executed by the computer based engine control unit of FIG. 1 in carrying out the control of this invention.
Figure 3:
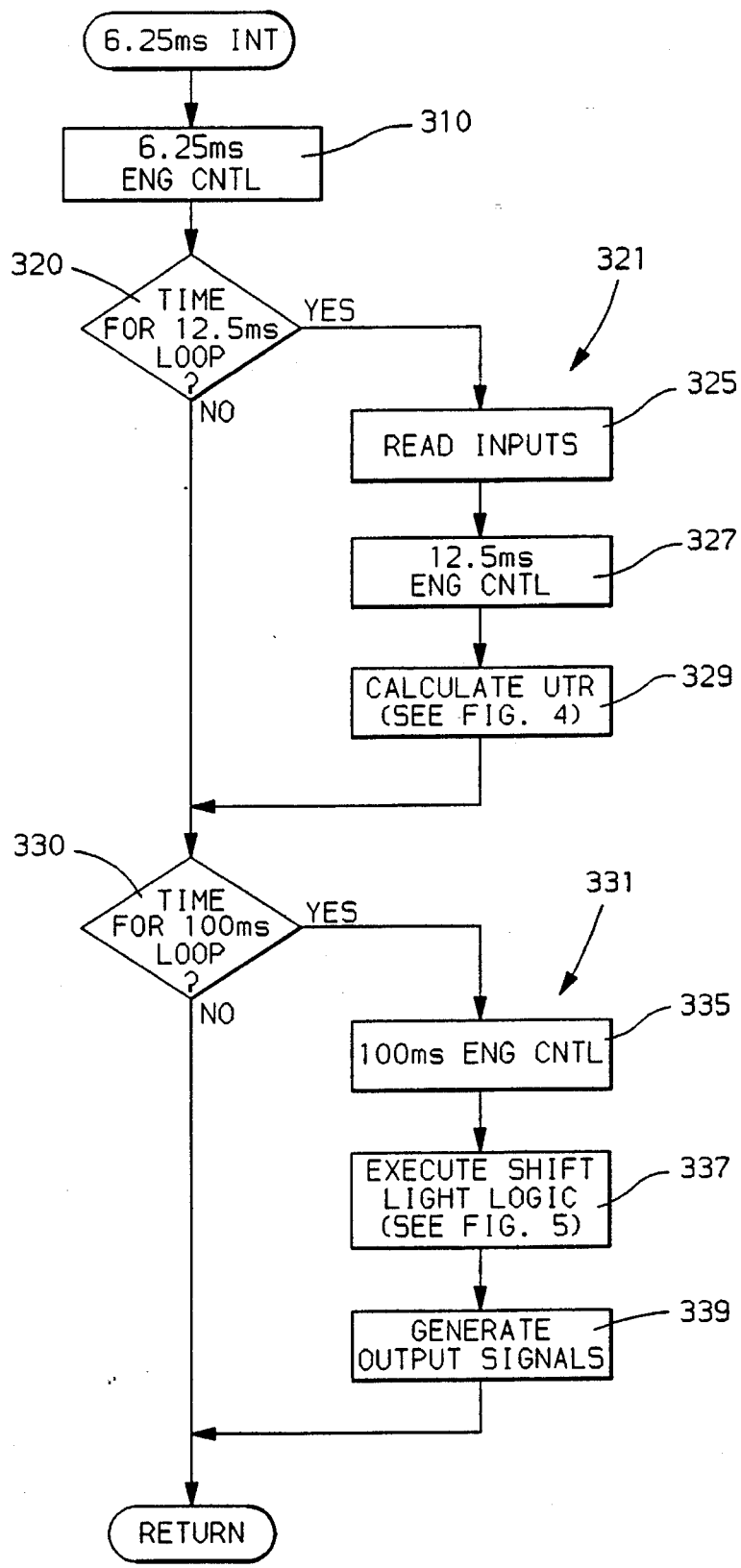
Figure 4:
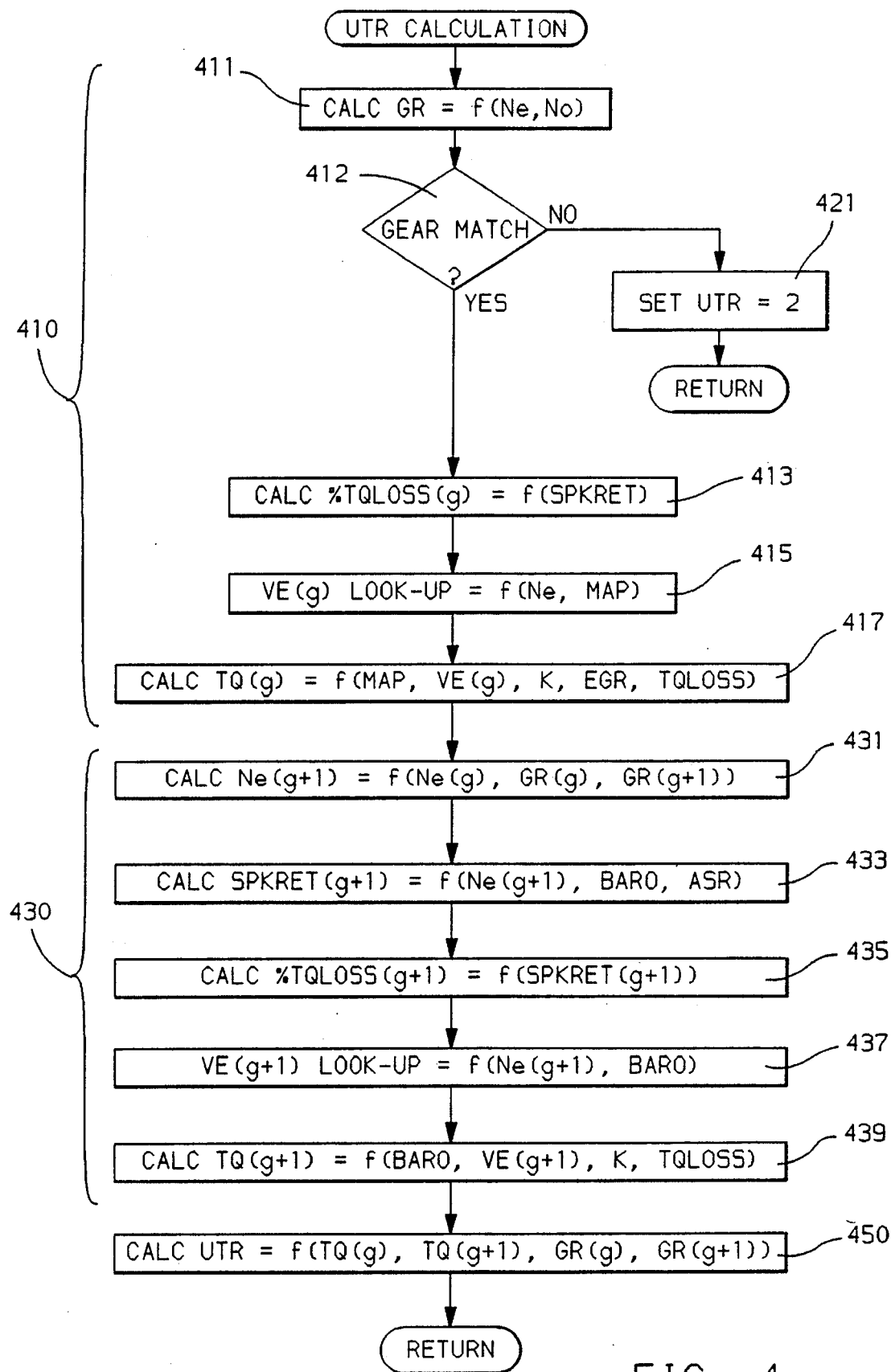

FIGS. 2–4, 5A ad 5B depict flow diagrams representative of computer program instructions executed by the computer based engine control unit 42 of FIG. 1 in carrying out the upshift indication function of this invention. The flow diagram of FIG. 2 represents an executive or main loop program which initiates the operation of a number of subroutines for performing various engine control related tasks. The flow diagrams of FIGS. 3–5 represent the subroutines which are pertinent to the upshift indication function of this invention.

Referring now more particularly to the main loop flow diagram of FIG. 2, reference numeral 210 generally designates a set of program instructions executed at the beginning of each period of vehicle operation. The instructions initialize various registers, timers, flags and variables stored in control unit 42. After initialization at 210, the routine proceeds to instruction block 220 and enables all software timer and hardware interrupts for executing subroutines to carry out various engine control functions. Step 230 is next encountered and represents an interrupt wait loop together with return line 231 wherein the control performs various conventional background functions such as engine diagnostic routines and reading and conditioning oxygen sensor inputs while awaiting a timer or hardware interrupt to call subroutines for performing various specific engine control functions according to predetermined schedules or triggering events.

In the present preferred embodiment, a timer interrupt (6.25 INT) occurs at 6.25 millisecond intervals and causes the execution of the program steps shown in FIG. 3. Instruction block 310 is first executed for performing various predetermined engine control functions appropriate for the frequency of the 6.25 ms interval. Decision block 320 is next executed to determine if a set of less frequently executed instructions generally designated by numeral 321 is to be executed. This may be caused to occur, for example, by well known and practiced techniques such as the expiration of a timer, requisite multiple passes through the 6.25 ms INT routine or separate timer interrupt having priority to execute and return control to the current 6.25 ms INT routine. Decision block 320 indicates an exemplary frequency for execution of instruction set 321 of every 12.5 ms which in the present embodiment is caused to occur every second pass through the 6.25 ms interrupt. If it is not time for execution of instruction set 321, control passes to decision block 330. Assuming it is time for execution of instruction set 321, control unit 42 at instruction block 325 reads and conditions the various input signals applied to lines 46–56, and calculates various terms used in subsequent steps, including spark retard, barometric pressure (BARO) and percent exhaust gas recirculation (%EGR). Instruction block 327 next performs various predetermined engine control functions appropriate for the frequency of the 12.5 ms interval. Block 329 refers to the computation of the Upshift Torque Ratio (UTR) which is set forth in detail in the flow diagram of FIG. 4 as shown.

Decision block 330 is next executed to determine if a set of even less frequently executed instructions generally designated by numeral 331 is to be executed. This may be caused to occur in any appropriate manner similar to those discussed for decision block 320 as are well known and practiced in the art. Decision block 330 indicates a frequency for execution of instruction set 331 of every 100 ms. If it is not time for execution of instruction set 331, the 6.25 ms interrupt routine is complete and control returns to the background routine of FIG. 2. Assuming it is time for execution of instruction set 331, control unit 42 at instruction block 335 perform various predetermined engine control functions appropriate for the frequency of the 100 ms interval. Block 337 refers to the execution of the shift light logic routine which is set forth in detail in the flow diagrams of FIGS. 5A and 5B as indicated. Finally, control unit 42 outputs a signal online 60 shown in FIG. 1 for indicating the state of the upshift indicator light as well as various other output signals for instrument cluster displays such as vehicle speedometer, oil pressure and coolant temperature for example.

Referring now to FIG. 4, a preferred routine for calculating the Upshift Torque Ratio (UTR CALCULATION) for use in upshift indication according to the present invention is illustrated. The parenthetical designations (g) and (g+1) where appended to variables as used herein designate current gear and next highest gear values, respectively. Where no parenthetical designations are used, current values are referenced. A set of steps generally designated by numeral 410 is first executed to determine a current value of engine torque. Upon entry of UTR CALCULATION, Block 411 calculates the current gear ratio "GR(g)" from current engine speed "Ne(g)" and output speed "No" according to the following expression:

$$GR(g)=Ne(g)/No$$

A check is made at decision block 412 to determine if the calculated gear ratio matches a known gear ratio and, if no match is recognized, passes processing to block 421 which sets upshift torque ratio (UTR) to a default value of two in the present embodiment and then exits the UTR CALCULATION routine. THE DEFAULT VALUE IS essentially a "don't care" value that won't be used for further processing as will be seen in later discussion of FIG. 5A, decision block 522. GR(g) will match a given gear provided the manual clutch is engaged and slip thereacross is minimal. Where the clutch is disengaged, as may be the case where the operator has initiated a shift, a gear match may not occur. If the gear ratio matches a known gear, block 413 calculates the percent torque loss "%TQLOSS" in the current gear due to the current amount spark retard. The present embodiment assumes spark retard is a controlled engine parameter used, for example, to control engine knock in a manner known in the art. Spark retard is preferably accounted for in this embodiment since it may have a significant effect on engine torque, especially at low and moderate engine speeds where both the incidence of engine knock is most prevalent and more fuel efficient upshifting will typically occur. The percent torque loss is determined through application of the expression:

$$\%TQLOSS(g)=SPKRET(g)/SPKRET(100\% \text{ tqloss})$$

where SPKRET(g) is the current amount of spark retard and SPKRET(100% tqloss) is the amount of spark retard needed for 100% torque loss. Spark retard may be determined from empirically determined calibration tables. Spark retard may be a value adaptively derived as shown, for example, in U.S. Pat. No. 5,090,382 issued Feb. 25, 1992 and assigned to Saturn Corporation.

Engine volumetric efficiency "VE(g)" is next referenced from a calibration table a function of engine speed Ne(g) and MAP at block 415. Current engine torque "TQ(g)" is then determined at block 417 according to the expression:

$$TQ(g)=[(MAP(g)*VE(g)*K)*(EGR(g))-Tf]*(TQLOSS)$$

where K is a calibration constant predetermined during fuel metering and related to actual engine displacement, operating temperature, combustion efficiency, fuel/air energy content and the universal gas constant; EGR(g) is a gain substantially corresponding to the complement of current percent exhaust gas recirculation (1−%EGR); Tf is a torque offset related to engine mechanical friction at current engine speed and the term TQLOSS represents a gain substantially corresponding to the complement of the percent torque loss attributed to the current spark retard (1−%TQLOSS(g)).

A set of steps generally designated by the numeral 430 is next executed for the purpose of calculating a predicted value of engine torque available in the next higher gear at the current output speed. Preferably, the predicted torque value corresponds to a maximum available torque (wide open throttle) in the next higher gear which simplifies the associated predicted torque calculation. The present embodiment exemplifies calculation of a predicted maximum engine torque.

Block 431 first calculates a predicted engine speed in the next higher gear Ne(g+1) based on current engine speed Ne(g), the current gear ratio GR(g) and the gear ratio in the next higher gear GR(g+1). It is an assumption at this step that output speeds at current and next higher gears No(g), No(g+1) would be substantially equivalent and therefore predicted engine speed is a simple function of the current engine speed, current gear ratio and next higher gear ratio in accordance with the following relationship:

$$Ne(g+1)=Ne(g)*GR(g+1)/GR(g)$$

Predicted spark retard in the next higher gear SPKRET(g+1) is calculated at block 433 from predicted engine speed Ne(g+1), BARO and any amount of adaptive spark retard (ASR) such as may be appropriately applied according to, for example, previously reference U.S. Pat. No. 5,090,382. Since the maximum engine torque available in the next higher gear is being determined, BARO is preferably used in lieu of a predicted value of MAP since BARO substantially represents a maximum torque condition. Alternatively, a predicted value for MAP could be used.

Predicted percent torque loss in the next higher gear "%TQLOSS(g+1)" due to predicted spark retard is calculated at block 435 according to the following relationship in a manner similar to that provided at step 413:

$$\%TQLOSS(g+1)=SPKRET(g+1)/SPKRET(100\% \text{ tqloss})$$

where SPKRET(g+1) is the predicted amount of spark retard (including any amount of adaptive spark retard) as calculated at block 433 and SPKRET(100% tqloss) is the amount of spark retard needed for 100% torque loss.

Block 437 next references predicted volumetric efficiency "VE(g+1)" in the next higher gear as a function of predicted engine speed Ne(g+1) and BARO. Again, BARO is utilized in lieu of a predicted MAP value since maximum engine torque conditions are assumed. The final step in the set designated 430 for calculating predicted engine torque in the next higher gear is designated 439 and calculates predicted engine torque "TQ(g+1)" according to the expression:

$$TQ(g+1)=[BARO*VE(g+1)*K)-Tf]*(TQLOSS)$$

where K is the calibration constant previously disclosed with regard to block 417; Tf is the torque offset related to engine mechanical friction at the predicted engine speed Ne(g+1) and the term TQLOSS represents a gain substantially corresponding to the complement of the percent torque loss attributed to the predicted spark retard (1−%TQLOSS(g+1)). It is here noted that BARO again is used in lieu of MAP in the preceding expression. Consistent with the assumption of maximum engine torque (wide open throttle), the percent exhaust gas recirculation becomes zero in the present embodiment. The gain attributed zero %EGR is therefore unity in the present embodiment thereby accounting for the absence of an explicit EGR gain term in the expression of the predicted engine torque.

Finally, block 450 establishes the current and predicted wheel torques as the product of respective engine torques and corresponding gear ratios, and establishes the ratio of predicted wheel torque to current wheel torque to establish the UTR in accordance with the expression:

$$UTR=(TQ(g+1)*GR(g+1))/(TQ(g)*GR(g))$$

In the present embodiment, of course, the UTR represents the ratio of maximum predicted wheel torque to current wheel torque. Thereafter, program control returns to decision block 330 illustrated in FIG. 3.

The UTR calculated provides a single dynamic parameter derived from continually updated inputs having measurable impact upon the wheel torque available in the current gear and from predicted wheel torque available in the next higher gear. Preferably, as illustrated in the present embodiment, dynamic torque reducing influences such as exhaust gas recirculation control and spark retard for engine knock control are factored into the torque calculations to provide for finely tuned torque estimations responsive to dynamic driving conditions. It is contemplated that other factors influencing engine torque, for example fuel composition in variable fuel vehicles, may likewise be factored into the expressions where appropriate.

A measure of the ratio of predicted wheel torque in the next higher gear to current wheel torque in the present gear (UTR) provides information for control of an upshift indicator in a manner less complicated and more accurately representative of dynamic driving conditions than conventional MAP threshold techniques. Additionally, the present invention utilizing UTR is suitable for customizing shift point indications according to any desired fuel economy/performance profile. When the UTR is less than one, the vehicle will decelerate and possibly exhibit undesirable driveline disturbance if an upshift is completed. With a UTR substantially equal to one, the operator may need to increase the throttle position in the next higher gear to maintain speed. Moreover, a UTR near one indicates an upshift point which will yield maximum fuel economy. As the UTR increases beyond one, more performance oriented shifts to the next higher gear are possible. Therefore, a calibration threshold against which the UTR is compared will determine the operation of an upshift indicator and corresponding shift feel and economy at that indicated shift point. The calibration threshold can readily be chosen to match the desired fuel economy/performance profile of the vehicle. The calibration may be so chosen to maximize actual fuel economy by indicating that an upshift is appropriate at a point where the pleasability of the shift yields high operator usage at relatively high levels of fuel economy.

Figure 5A:
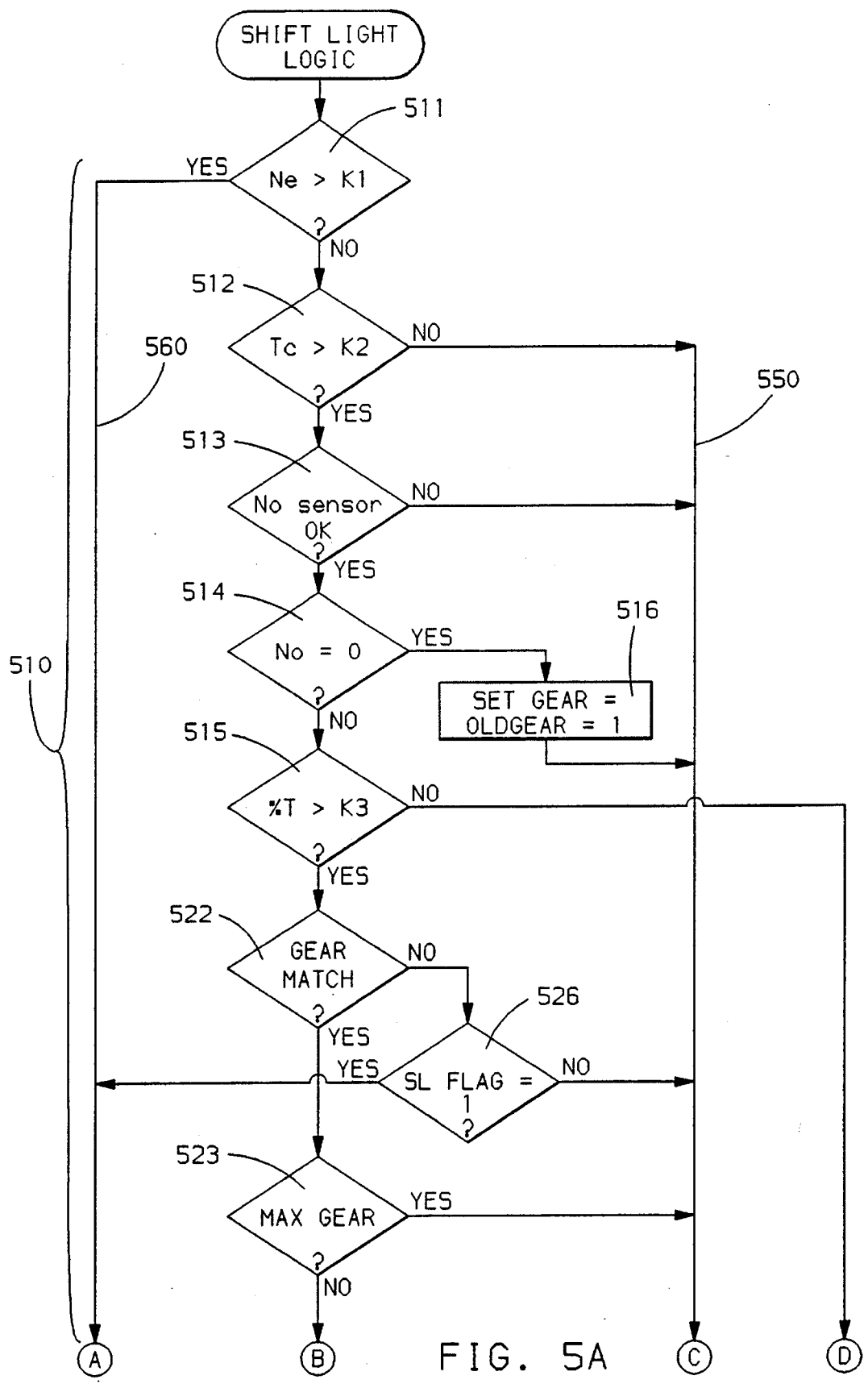
Figure 5B:
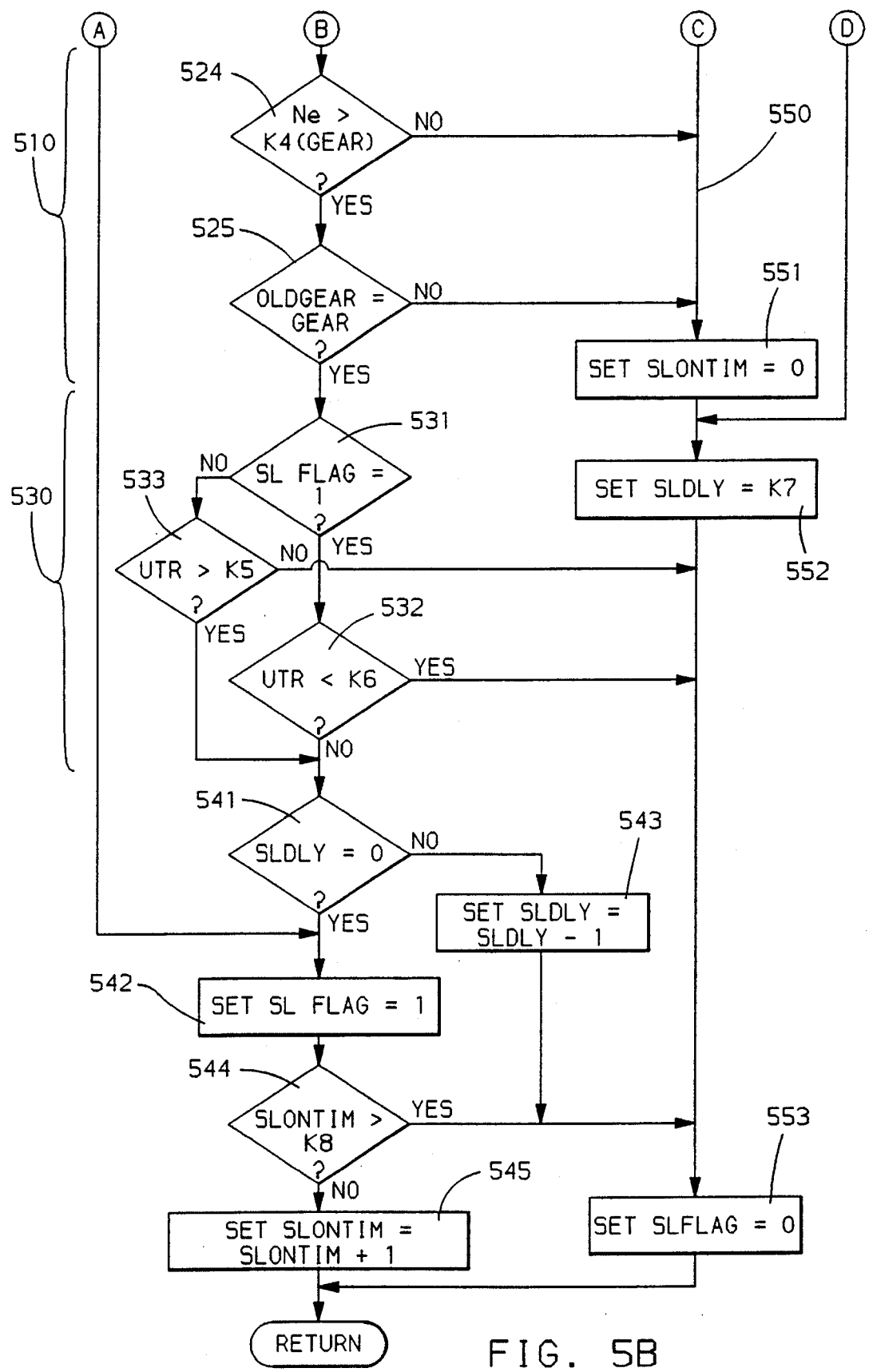

Turning to FIG. 5, and exemplary flow chart is illustrated for utilizing the UTR previously calculated for upshift indication according to the invention. The SHIFT LIGHT LOGIC routine of FIGS. 5A and 5B is executed at step 337 of the 6.25 ms interrupt routine set forth in FIG. 3 and comprises a set of entry condition steps (blocks 511 through 525) designated generally by numeral 510 and a set of shift threshold steps (531 through 533) designated generally by numeral 530. The purpose of the SHIFT LIGHT LOGIC routine is to establish the state of the shift light flag "SL FLAG" which in turn controls the state of the shift light. First, engine speed Ne is checked at block 511 to determine if it exceeds a predetermined maximum allowable engine speed threshold K1. If the threshold is exceeded then an upshift is required regardless of the value of UTR and control is therefore passed via line 560 to block 542 where the shift light flag is set to one (SL FLAG=1). If the threshold at block 511 is not exceeded, decision block 512 is encountered.

Decision block 512 performs a check of coolant temperature against a predetermined threshold K2. Where the threshold is not exceeded, the engine has not attained a predetermined operating temperature and control passes to line 550 to bypass shift threshold steps 530. Where the coolant temperature threshold is satisfied, decision block 513 is next executed.

Decision block 513 determines if the output speed sensor is operational. If the speed sensor is not operational, control passes to line 550 to bypass shift threshold steps 530. An operational output speed sensor allows control to pass to decision block 514 where a check is performed to determine if the vehicle is at a standstill (No=0). Where the vehicle is at rest, block 516 sets GEAR and OLDGEAR to the lowest gear value of 1 representing first or starting gear; thereafter, bypass of shift threshold steps 530 occurs via line 550. If the vehicle is not at rest, decision block 515 is next encountered.

Throttle position "%T" is checked at block 515 against a closed position threshold K3. Closed throttle is indicative of vehicle coast, a state of operation wherein the engine is not imparting torque to the drive wheels and thus does not necessitate an upshift. Closed throttle may also be indicative of the operator purposefully using the drivetrain to decelerate the vehicle. Therefore, where a closed throttle is detected, control bypasses the upshift threshold steps 530 and proceeds with execution of block 552. A non-closed-throttle position is indicative of the engine imparting torque to the drive wheels—operation which may benefit from a gear upshift—and therefore control remains in the entry condition steps 510 by executing block 522.

A check is performed at block 522 to determine if the current calculated gear ratio GR(g) matches a known gear ratio associated with a GEAR value (i.e. 1–5). As mentioned in connection with step 412 in FIG. 4, an already initiated shift may account for a no gear match condition. If no match occurs control passes to decision block 526 thereby bypassing the remaining entry condition steps 510 and any shift threshold steps 530. Block 526 decides if the shift light is active by checking SL FLAG and if so passes control to line 560 to maintain the current SL FLAG state as one. Where block 526 decides that the shift light is inactive, control passes to line 550 to likewise maintain the current SL FLAG state as zero. Therefore, a no gear match condition maintains the current state of SL FLAG and bypasses processing of shift threshold steps 530. A gear match at block 522 passes control to decision block 523.

The current matched gear is checked at block 523 to determine if it is the highest gear available in which case no upshift is possible. If GEAR is equal to the highest gear available then upshift threshold steps 530 are bypassed via line 550. If higher gears are available then processing continues at step 524 with a check if the engine speed Ne exceeds a predetermined threshold speed K4(GEAR) which is a function of the current gear and represents a minimum engine speed appropriate for upshift to the next gear. Where the threshold engine speed is not exceeded, upshift threshold steps 530 are bypassed via line 550. Where the threshold engine speed has been satisfied, a final entry condition step is performed at block 525 to determine if the current gear status is steady state. If the current gear does not equal the last gear (GEAR≠OLDGEAR), then a steady state condition is not present and line 550 is once again used to bypass execution of the upshift threshold steps 530. A steady state wherein the last known gear equals the current gear allows processing to pass into the upshift threshold steps 530.

With the exception of throttle entry condition at block 515, any failed decision block in the entry condition steps 510 routes processing to block 551 which initializes a shift light on counter "SLONTIM". Block 552 is thereby next encountered and initializes a shift light delay counter "SLDLY" to a predetermined threshold value K7. Block 552 is alternatively encountered as a first step after failed throttle entry condition at block 515 thereby bypassing block 551 and corresponding reset on SLONTIM thereat. This is done for the purpose of preventing continual resetting the timer and cycling of the shift light during closed throttle engine braking on a downhill grade and also for preventing resetting of the timer if closed throttle is momentarily encountered. The exact purpose and usage of SLONTIM and SLDLY will be explained at a later point. Finally, it follows that since an entry condition was not satisfied in steps 510, the shift light flag is set to zero (SL FLAG=0) to thus establish the shift light state as OFF.

Upshift threshold steps 530 are accessed at decision block 531 whereat a determination as to the shift light state is made according to the status of SL FLAG. If the shift light is off (SL FLAG=0) then the routine branches to the left and executes block 533. Block 533 compares UTR to a first predetermined torque ratio threshold K5 which if not exceeded causes execution of block 553 thereby maintaining the shift light flag at a value of zero. If the result of decision block 533 is that UTR exceeds the threshold K5, then processing passes to block 541. Returning to block 531, if the shift light is on (SL FLAG=1) then block 532 is executed to compare UTR to a second predetermined torque ratio threshold K6. In the case where UTR is less than the threshold K6, then block 553 is executed and sets the shift light flag to zero. Alternatively, where UTR equals or exceeds the threshold K6, decision block 541 is executed. The preceding steps of upshift threshold steps 530 comprise separate checks of UTR against one of two torque ratio thresholds K5 or K6 wherein K5>K6, the threshold check being determined according to the state of the SL FLAG. A degree of hysteresis is thereby introduced to stabilize the state of the SL FLAG and corresponding shift light state.

Decision block 541 is executed from either block 533 or 532 when it is appropriate according to the predetermined torque thresholds for the SL FLAG to be set to one (SL FLAG=1). Block 541 checks shift light delay counter SLDLY for expiration, thereby introducing a delay into the routine prior to setting the SL FLAG at block 542 according to a predetermined number of passes through upshift threshold steps 530 and on to block 541 without intervening failure at any preceding entry condition step 511 though 525 to minimize shift light busyness. Where the shift light delay counter has not expired, it is decremented at block 543 and passes control to block 553 thus setting the shift light flag to zero (SL FLAG=0). An expired shift light delay counter as determined at block 541 causes processing to proceed to block 542 where the shift light flag is set to one (SL FLAG=1). Thereafter execution of block 542, decision block 544 is encountered and checks if the shift light on counter SLONTIM exceeds a predetermined threshold K8. Where the threshold K8 is exceeded, the shift light flag is set to zero at block 553 thereby limiting the indicator light on time to prevent any annoyance continual illumination may cause to operators who choose to ignore it. Where the threshold K8 has not been exceeded, the shift light on counter SLONTIM is incremented at block 545.

When SHIFT LIGHT LOGIC routine shown in FIG. 5 returns control to block 339 in FIG. 3, the state of SL FLAG is used to establish an output signal on line 60 of control unit 42 to cause illumination of a shift indicator light as previously described.

While the invention has been exemplified with respect to a preferred embodiment as disclosed herein, it is contemplated that various modifications and alterations will be apparent to one having ordinary skill in the art and therefore the embodiment is intended to be taken by way of example and not limitation. Accordingly, the invention is intended to embrace all alternatives, modifications and variations which are within the scope of the appended claims.

The embodiments of the invention in which an exclusive property or privilege is claimed are defined as follows:

1. In a motor vehicle having an engine and a manual transmission for imparting torque to at least one wheel and an upshift indication means for indicating a shift point by prompting a vehicle operator to shift from a current gear to a next higher gear, a method of shift point indication comprising the steps of:

calculating a torque ratio of a predicted wheel torque in accordance with the next higher gear to a present wheel torque in accordance with the current gear;

comparing the torque ratio to a predetermined threshold; and outputting a signal when said torque ratio exceeds said predetermined threshold to thereby indicate said shift point.

2. A method of shift point indication according to claim 1 wherein said predicted wheel torque substantially corresponds to a maximum wheel torque.

3. A method of shift point indication according to claim 1 wherein said predetermined threshold corresponds to a torque ratio whereat a shift to the next higher gear will maximize fuel economy.

4. In a motor vehicle having an engine and a manual transmission for imparting torque to at least one wheel and an upshift indication means for indicating a shift point by prompting a vehicle operator to shift from a current gear to a next high gear, a method of shift point indication comprising the steps of:

calculating a current engine torque value in the current gear in accordance with predetermined engine parameters;

calculating a predicted engine torque value in the next higher gear in accordance with said predetermined engine parameters;

establishing a current wheel torque value from said current engine torque value in the present gear and a gear ratio corresponding thereto;

establishing a predicted wheel torque value from said predicted engine torque value in the next higher gear and the gear ratio corresponding thereto;

calculating a torque ratio of said predicted wheel torque to said current wheel torque;

comparing said torque ratio to a predetermined threshold; and outputting a signal when said torque ratio exceeds said predetermined threshold to thereby indicate said shift point.

5. A method of shift point indication according to claim 4 wherein said predetermined engine parameters comprise spark retard.

6. A method of shift point indication according to claim 4 wherein said predetermined engine parameters comprise exhaust gas recirculation.

7. A method of shift point indication according to claim wherein said predetermined engine parameters comprise fuel composition.

* * * * *